(12) United States Patent
Roestenberg et al.

(10) Patent No.: US 9,550,142 B2
(45) Date of Patent: Jan. 24, 2017

(54) DEVICE FOR TEMPERATURE SWING PROCESS

(71) Applicant: ANTECY B.V., Hoevelaken (NL)

(72) Inventors: Timo Roestenberg, Deventer (NL); Gerrit Brem, Wapenveld (NL)

(*) Notice: Subject to any disclaimer, the term of this patent is extended or adjusted under 35 U.S.C. 154(b) by 48 days.

(21) Appl. No.: 14/415,149

(22) PCT Filed: Jul. 17, 2013

(86) PCT No.: PCT/EP2013/065074
§ 371 (c)(1),
(2) Date: Jan. 16, 2015

(87) PCT Pub. No.: WO2014/012966
PCT Pub. Date: Jan. 23, 2014

(65) Prior Publication Data
US 2015/0182904 A1     Jul. 2, 2015

Related U.S. Application Data

(60) Provisional application No. 61/672,333, filed on Jul. 17, 2012.

(51) Int. Cl.
*B01D 53/04* (2006.01)
*B01D 53/26* (2006.01)
(Continued)

(52) U.S. Cl.
CPC ......... *B01D 53/0462* (2013.01); *B01D 53/261* (2013.01); *B01J 20/04* (2013.01); *B01J 20/28045* (2013.01); *C01B 31/20* (2013.01); B01D 2251/306 (2013.01); B01D 2251/606 (2013.01); B01D 2253/102 (2013.01); B01D 2253/25 (2013.01); B01D 2257/504 (2013.01); B01D 2257/80 (2013.01); B01D 2259/4005 (2013.01); B01D 2259/40056 (2013.01); B01D 2259/40086 (2013.01); B01D 2259/65 (2013.01); Y02C 10/08 (2013.01); Y02P 20/152 (2015.11)

(58) Field of Classification Search
CPC .............. B01D 53/0462; B01D 53/261; B01D 2251/306; B01D 2251/606; B01D 2253/102; B01D 2253/25; B01D 2257/80; B01D 2257/504; B01D 2259/4005; B01D 2259/50056; B01D 2259/40086; B01D 2259/65; B01J 20/04; B01J 20/28045; C01B 31/20; Y02C 10/08; Y02P 20/152
USPC ............................... 95/90, 148; 96/143–145
See application file for complete search history.

(56) References Cited

U.S. PATENT DOCUMENTS

| 4,344,778 A * | 8/1982 | Matsuoka | C01B 5/00 96/145 |
| 2010/0251887 A1* | 10/2010 | Jain | B01D 53/0462 95/46 |
| 2012/0160099 A1* | 6/2012 | Shoji | B01D 53/025 95/139 |

* cited by examiner

*Primary Examiner* — Frank Lawrence
(74) *Attorney, Agent, or Firm* — Ramin Amirsehhi LL.M.; David P. Owen; Hoyng Rokh Monegier LLP

(57) ABSTRACT

A device is disclosed for conducting an adsorption/desorption swing reaction. The desorption step of the reaction is conducted at least in part at a temperature below 100° C. Dry steam is used for purging the reactor and the adsorbent bed in the reactor. For this purpose the device has a water reservoir, and a vacuum source in fluid connection with the water reservoir and the reactor. During the desorption step the vacuum source causes water to evaporate, and the water vapor to flow through the reactor.

11 Claims, 5 Drawing Sheets

(51) Int. Cl.
*B01J 20/04* (2006.01)
*B01J 20/28* (2006.01)
*C01B 31/20* (2006.01)

US 9,550,142 B2

DEVICE FOR TEMPERATURE SWING PROCESS

BACKGROUND OF THE INVENTION

1. Field of the Invention

The invention relates generally to a device for conducting an adsorption/desorption temperature swing process, and more particularly to such a device that uses dry steam for purging a reactor during the desorption step.

2. Description of the Related Art

Temperature swing reactors are known in the art. During a temperature swing process a first part of the process is conducted at a first temperature, $T_1$, and a second part of the process is conducted at a second temperature, $T_2$. After completion of the second part of the process the temperature is swung back to $T_1$, and the cycle recommences.

Temperature swing reactors can be used, for example, for adsorption/desorption processes, wherein the desorption temperature $T_2$ generally is higher than the adsorption temperature, $T_1$. It may be desirable to aid the desorption process by purging the reactor with an inert gas. Dry steam is often the preferred inert gas for this purging operation, because it can readily be produced on site, and is generally far less expensive than alternative inert gases, such as nitrogen or helium. In addition, water vapor can be easily separated from the desorbing gas by selective condensation.

Our co-pending patent application, filed on the same day as the instant application, entitled "Materials and Process for Reversible Adsorption of Carbon Dioxide", which is hereby incorporated by reference in its entirety, discloses adsorbent materials from which carbon dioxide can be desorbed at least in part at temperatures below 100° C. It would be desirable to use an inert purging gas during the carbon dioxide desorption step of the process. However, conventional steam generation processes do not produce dry steam at temperatures below 100° C.

Thus, there is a particular need for a temperature swing reactor in which at least part of the desorption step is conducted at a temperature below 100° C., and in which dry steam can be used as a purging gas even at temperatures below 100° C.

BRIEF SUMMARY OF THE INVENTION

The present invention addresses these problems by providing a device for conducting an adsorption/desorption temperature swing process having a desorption step conducted at least in part at a desorption temperature below 100° C., said device comprising (i) a reservoir containing water; (ii) a reactor containing an adsorbent; and (iii) a vacuum source; the reservoir, the reactor and the vacuum source being in fluid connection with each other during the desorption step so that the vacuum source causes water in the reservoir to evaporate, and water vapor to flow through the reactor for purging the adsorbent.

The reservoir can be a vessel containing liquid water; or it can be a water adsorbent material having water adsorbed thereto.

BRIEF DESCRIPTION OF THE DRAWING

The features and advantages of the invention will be appreciated upon reference to the following drawings, in which.

DETAILED DESCRIPTION OF THE INVENTION

Figure 1:
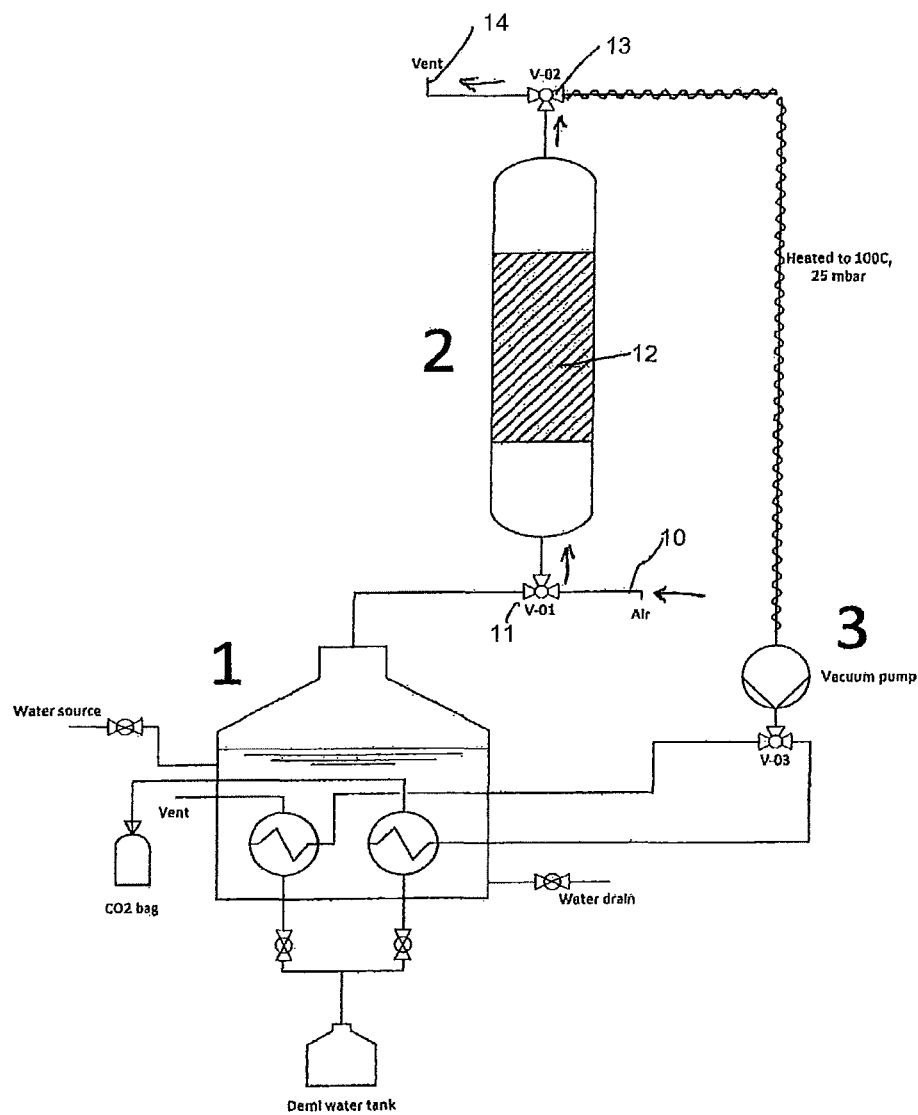
FIG. 1 is a schematic representation of a device according to the invention, in adsorption mode.

The following is a detailed description of the invention.

Definitions

The term "dry steam" as used herein means water vapor having a temperature $T_w$ and a partial pressure $P_w$, wherein the partial pressure $P_w$ is less than the saturated steam pressure at temperature $T_w$.

The term "temperature swing process" as used herein means a process comprising at least two steps, wherein a first step is conducted at a first temperature and the second step is conducted at a second temperature, the second temperature being different from the first temperature. During the process the temperature is cycled from the first temperature to the second temperature, and back to the first temperature.

In its broadest aspect the present invention relates to an adsorption/desorption temperature swing process. The process comprises an adsorption step, conducted at a first temperature $T_1$, and a desorption step conducted at least in part at a second temperature $T_2$, with $T_2 > T_1$. The second temperature $T_2$ is less than 100° C., which means that at least part of the desorption step is conducted at a temperature below 100° C. Examples of such a process are disclosed in detail in our co-pending patent application of the same date, entitled "Materials and Process for Reversible Adsorption of Carbon Dioxide," the disclosures of which are incorporated herein by reference.

The device of the present invention addresses the need for dry steam to be used as a purging gas during the desorption step, including the portion or portions of the desorption step conducted at temperatures below 100° C.

The device of the invention comprises (i) a reservoir containing water; (ii) a reactor containing an adsorbent; and (iii) a vacuum source. The reservoir may be a vessel containing liquid water, or it can be a water adsorbent material having water adsorbed thereto.

During the desorption step the reservoir, the reactor and the vacuum source are in fluid connection with each other. The vacuum source causes water in the reservoir to evaporate (in case of a vessel with liquid water) or to desorb (in case of an adsorbent having water adsorbed thereto), and water vapor to flow through the reactor for purging the adsorbent.

In case of a vessel containing liquid water, the reservoir has a temperature $T_w$, which is lower than the temperature $T_d$ of the reactor during the any portion of the desorption step. For example, the reservoir may be kept at ambient temperature, e.g., 25° C. The vacuum source reduces the pressure in the reservoir, which causes water in the reservoir to evaporate. However, the partial pressure of the water vapor will be equal to, or less than, $P_{25}$ the saturated steam pressure at 25° C. The desorption temperature $T_d$ in the reactor is more than 25° C. As a result, the water vapor passing through the reactor having a partial pressure $P_{25}$, has a lower pressure than the saturated steam pressure of $T_d$. In other words, the water vapor purging the reactor meets the definition of dry steam. No condensation of water vapor takes place in the reactor during the desorption step.

As the purpose of the desorption step is to collect gases adsorbed to the adsorbent during the adsorption step, the device conveniently comprises a reservoir for collecting gas desorbed from the adsorbent during the desorption step.

It is desirable to remove water vapor from the desorbing gas prior to collecting the desorbing gas in a reservoir. To this end, the device may contain one or more heat exchangers for cooling down the desorbed gas, whereby an important portion of the water vapor present in the desorbing gas is removed by condensation. The heat exchanger or exchangers allow heat from gases leaving the reactor to be recovered.

In an embodiment, heat recovered from gases leaving the reactor is transferred to water in the reservoir.

Conveniently, the vacuum source can be a vacuum pump. Since condensation of water vapor may occur in or near the vacuum pump, the vacuum pump preferably is a self-drying vacuum pump.

One of the tasks of the vacuum pump is to provide an operating pressure that is low enough to cause significant evaporation of water in the reservoir. Preferably the operating pressure is low enough to cause the water in the reservoir to boil. In practice the operating pressure can be, for example, 30 mbar or less, preferably 25 mbar or less. For perspective, 25 mbar is the saturated steam pressure at 21° C.; 30 mbar is the saturated steam pressure at 24° C. It will be understood that different reservoir temperatures dictate different operating pressures. If, for example, the reservoir temperature is 15° C. the operating pressure may be kept at 17 mbar; if the reservoir temperature is 35° C. the operating pressure may be as high as 56 mbar.

The device conveniently comprises a water source for replenishing water in the reservoir. In addition, the device may contain a reservoir for collecting demineralized water from the vacuum source and/or the one or more heat exchangers.

The use of water as purging gas has a disadvantage in that the presence of water during the desorption step shifts the adsorption/desorption equilibrium to the adsorption side. This is because the adsorption of carbon dioxide (under formation of a bicarbonate) consumes water, and the desorption generates water. The equilibrium-shifting effect of the water present in the purge gas is greatly diminished, however, due to the fact that the desorption step is carried out under reduced pressure. For this reason the use of a vacuum source offers advantages even at desorption temperatures in excess of 100° C., because it permits the use of water as a purge gas without incurring a serious equilibrium-shifting penalty.

DESCRIPTION OF ILLUSTRATIVE EMBODIMENTS/EXAMPLES

The following is a description of certain embodiments of the invention, given by way of example only and with reference to the drawings. Referring to FIG. 1, a device is shown during the adsorption step. The device of FIG. 1 is set up for adsorbing carbon dioxide and water from atmospheric air. It will be understood that the device can be modified for adsorbing carbon dioxide from a gas mixture other than air, such as flue gas, or for selectively adsorbing a gas other than carbon dioxide from any type of gas mixture.

FIG. 1 shows a device comprising a water reservoir 1, a reactor 2, and a vacuum source 3. However, water reservoir 1 and vacuum source 3 are not operational during the adsorption step.

During the adsorption step atmospheric air enters the device at 10, and flows via valve 11 into reactor 2. The air is propelled by a fan or a pump (not shown). It is also possible to propel the air flow by other means, for example a solar chimney, an atmospheric vortex device, or by making use of day time/night time temperature differences.

The air flow passes through adsorbent bed 12, where water vapor and carbon dioxide are adsorbed from the air flow onto the adsorbent. From adsorbent bed 12 the air flows through valve 13 to vent 14, where it is released into the atmosphere. Instead of a single adsorbent bed, reactor 2 can contain two or more adsorbent beds. The adsorbent beds can be of identical composition or of differing compositions. In the latter case each adsorbent bed can be designed for adsorbing different gas components, or combinations of gas components, from the air flow.

In the embodiment the adsorption step is conducted at ambient temperature. It will be understood that the adsorption step can be conducted at a higher or a lower temperature.

Figure 2:
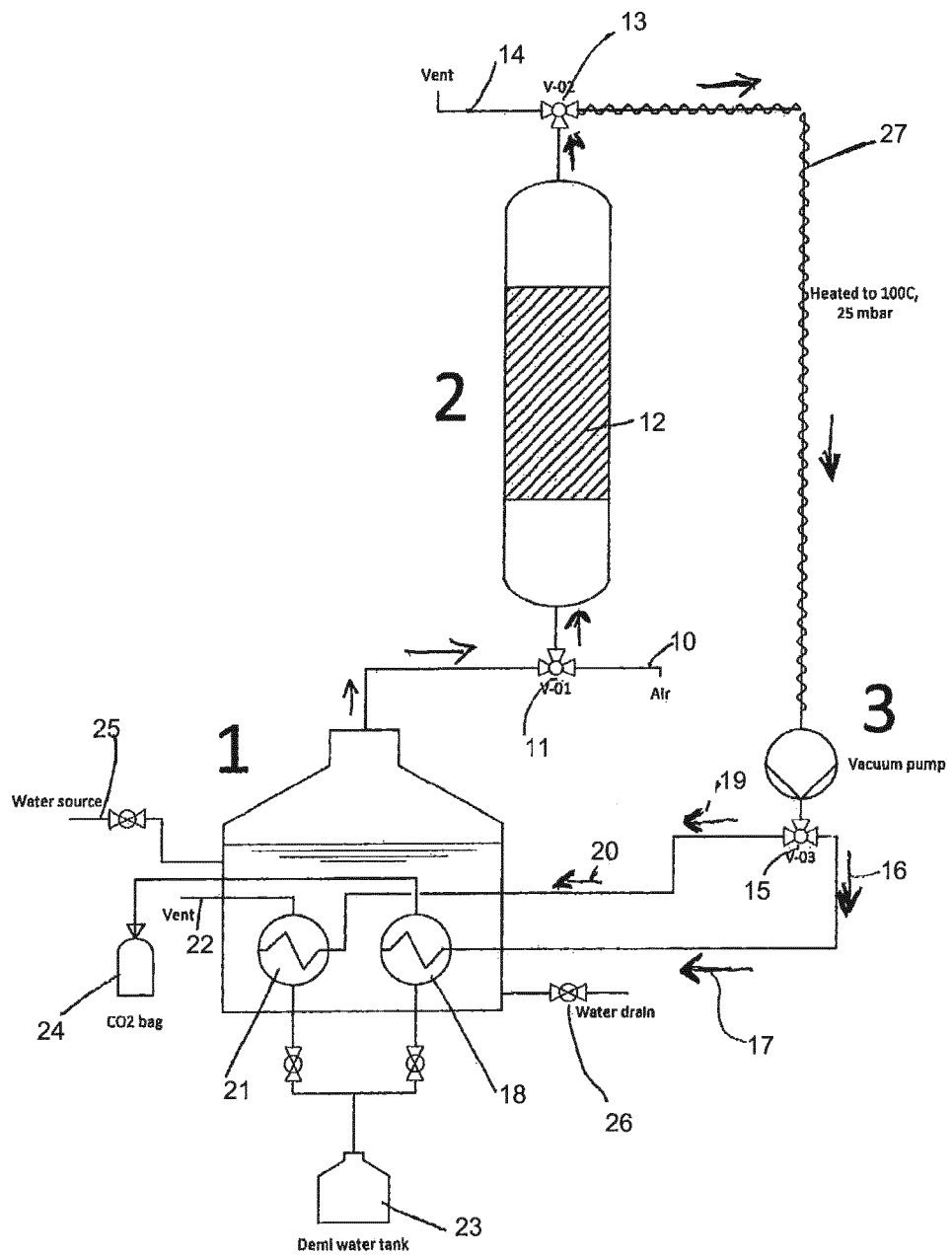
FIG. 2 shows the device of FIG. 1 in desorption mode.

FIG. 2 shows the device of FIG. 1 during the desorption step. Valves 11 and 13 have been switched, so that air inlet 10 and vent 14 are closed off, and fluid communication is established between vacuum source 3 and water reservoir 1. Vacuum source 3 establishes a pressure low enough to create an operating pressure inside water reservoir 1 of 25 mbar (allowing for any pressure drops over restrictions between the vacuum source 3 and water reservoir 1, such as adsorbent bed 12 and valves 11 and 13).

Initially the adsorbent bed 12 is kept at ambient temperature. The operating pressure of 25 mbar in water reservoir 1 causes water to evaporate. Water vapor is caused by vacuum source 3 to flow through the reactor 2 and adsorbent bed 12. This flow of water vapor purges air from the reactor.

While air is being purged valve 15 directs the gas flow via arrows 19 and 20 to heat exchanger 21, and from there to vent 22. The gas flow is cooled in heat exchanger 21, and any condensed water is collected in demineralized water tank 23. Heat recovered by heat exchanger 21 is transferred to the water in reservoir 1.

Once the air has been purged from reactor 2, the reactor bed is heated to 30° C. to start the actual desorption step. The gas flow is now directed by valve 15, via arrows 16 and 17, to heat exchanger 18 and eventually to carbon dioxide tank 24. It may be desirable to remove residual water from gas leaving heat exchanger 18, for example with a zeolite bed (not shown). The gas flow is cooled in heat exchanger 18, and any condensed water is collected in demineralized water tank 23. Heat recovered by heat exchanger 21 is transferred to the water in reservoir 1.

During the desorption step it is desirable to gradually increase the temperature of adsorbent bed 12, to ensure a more complete desorption. For example, the temperature of the desorption bed may be gradually increased from 30° C. to 180° C.

Since water is evaporated from reservoir 1, and recovered demineralized water is collected in tank 23 and not returned to reservoir 1, it will be necessary to replenish the water in reservoir 1 via inlet valve 25. Any source of water can be used, including tap water, well water, industrial water, surface water (such as river water or lake water), and even salt water from a sea or ocean, with the proviso that the water source preferably be substantially free of volatile contaminants. To avoid excessive build-up of minerals and contaminants in reservoir 1 the reservoir can be purged using inlet 25 and outlet 26.

Optionally the conduits leading from the reactor 2 to the vacuum source 3 can be heated, for example with heating tape 27, to prevent condensation of water upstream of vacuum source 3. However, if a self-drying vacuum pump is used, such heating is generally not necessary.

Figure 3:
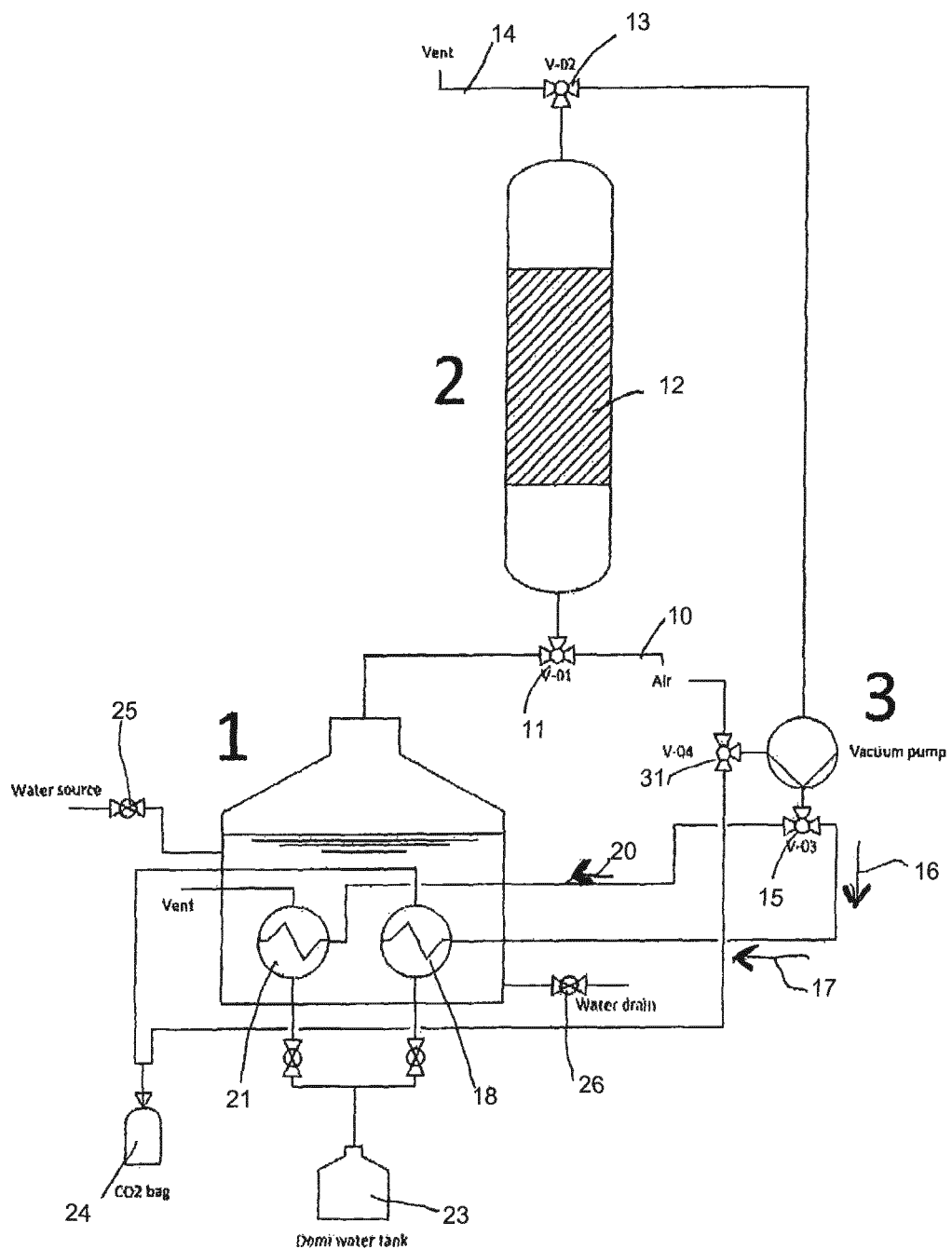
FIG. 3 shows a device similar to that of FIGS. 1 and 2, with a self-drying vacuum pump.

FIG. 3 shows a device similar to that of FIGS. 1 and 2, except that vacuum pump 3 is of the self-drying kind. Liquid water is allowed to collect in the head of pump 3, from which it is purged from time to time by closing a valve inside the pump (not shown), which temporarily disconnects the pump from the reactor.

During its operation the device effectively converts inexpensive water to far more valuable demineralized water. In addition, the adsorbent bed may adsorb water from ambient air during the adsorption step. Such water is collected as demineralized water during the desorption step. Demineralized water produced by the device can be used for industrial purposes, such as chemical reactions; for agricultural purposes, such as drinking water for cattle, or water for irrigation, optionally after addition of nutrients; for household use, such as laundry and cleaning; and even as drinking water for humans, after addition of appropriate minerals.

Figure 4:
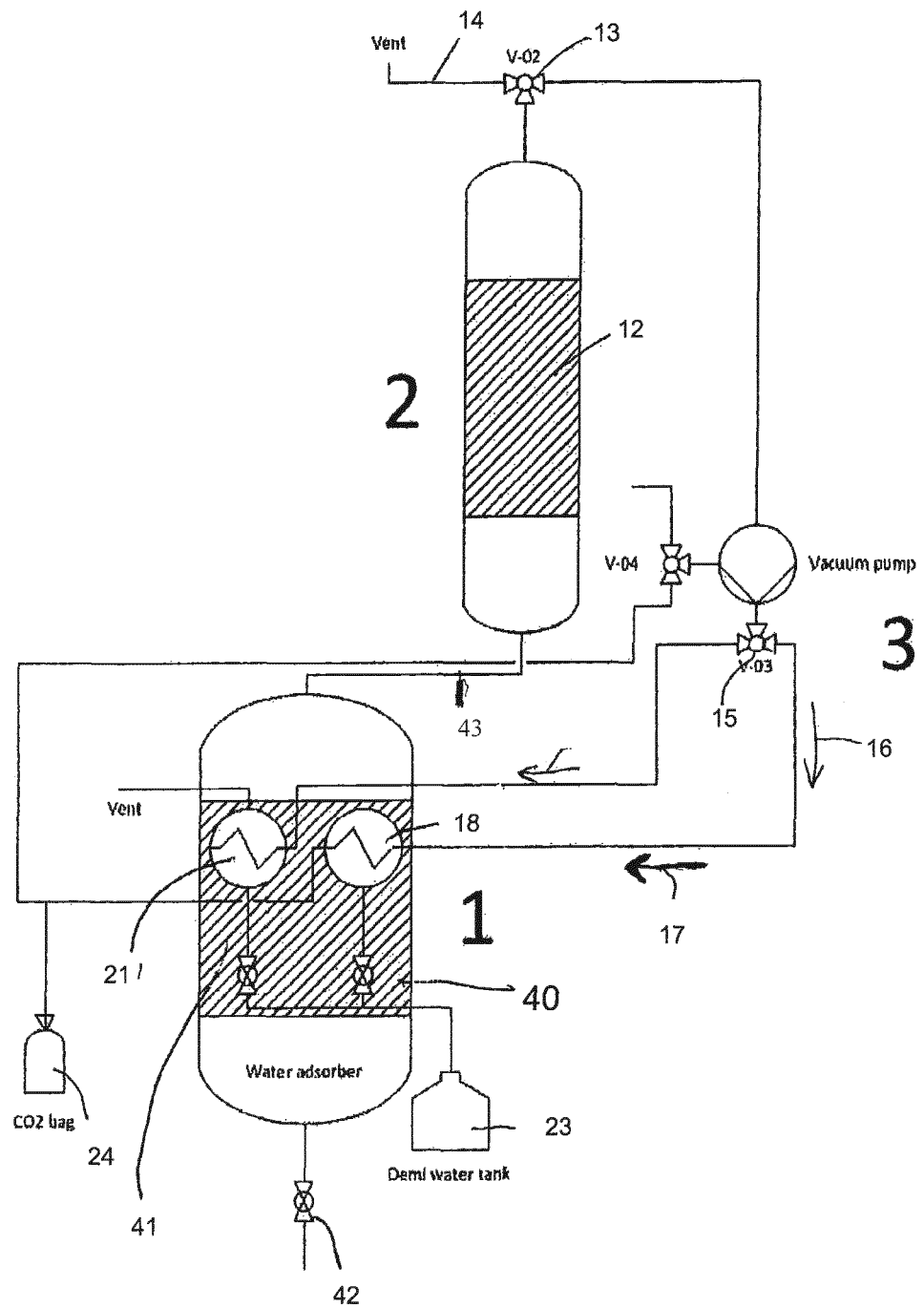
FIG. 4 shows a device according to the invention with an adsorption column as the water reservoir.
Figure 5:
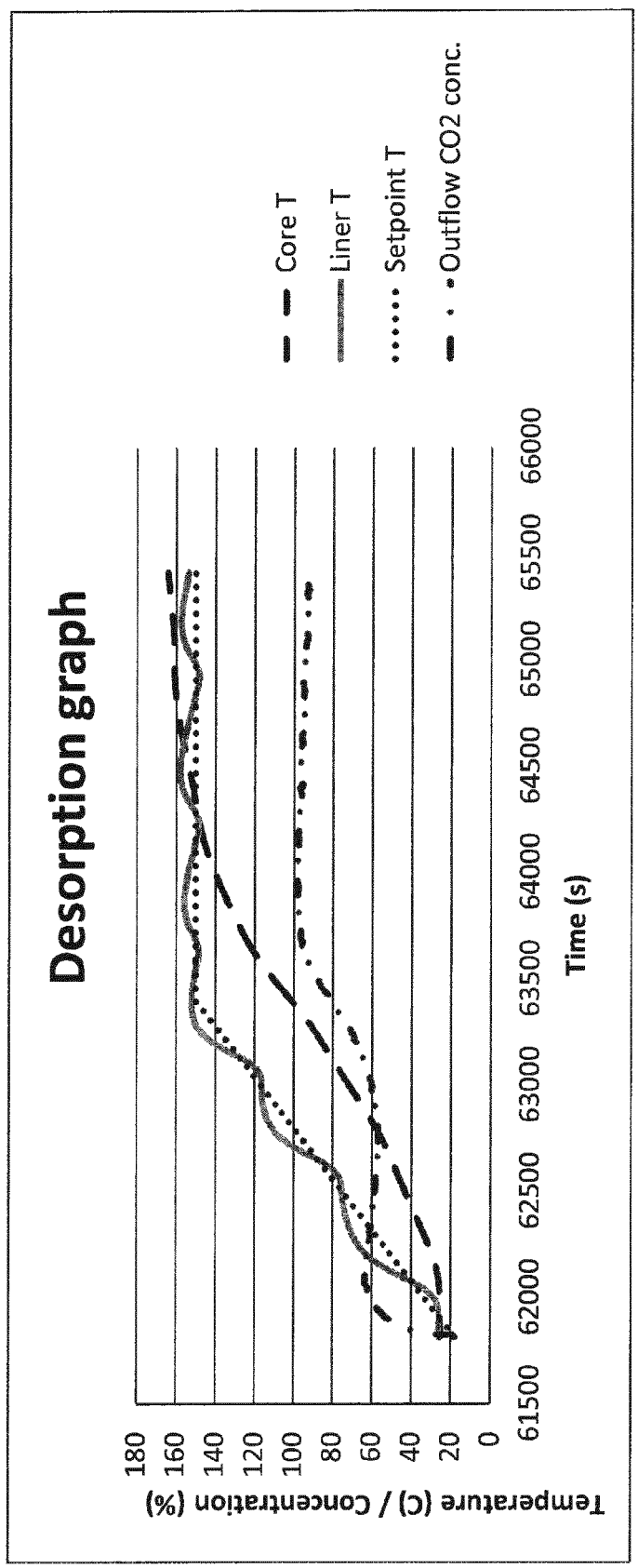
FIG. 5 shows the production of high-purity $CO_2$ with the device of FIG. 3.

FIG. 4 shows an alternate embodiment of the device. In this device the water reservoir is replaced with column 40 containing a bed 41 of a water absorbent material, such as silica gel. During the adsorption step air enters column 40 via valve 42. Pre-dried air leaving column 40 is led to adsorbent bed 12 via conduit 43. The pre-dried air should contain enough moisture to enable the adsorption of carbon dioxide in bed 12, i.e., the predried air should contain water and carbon dioxide in a water:carbon dioxide molar ratio of at least 1:1. Put differently, since air contains approximately 400 ppm carbon dioxide by weight, the pre-dried air should contain at least about 160 ppm water by weight. Under typical conditions the pre-dried air contains well in excess of 160 ppm water by weight, which is acceptable. Carbon dioxide adsorption proceeds as explained with reference to FIG. 1.

During the desorption mode valve 42 is closed and vacuum pump 3 is switched on. First the temperature of bed 41 is increased, to initiate the release of adsorbed water. Desorbed water from bed 41 is passed through bed 12 to purge air from bed 12. After bed 12 has been purged, the temperature of bed 12 is increased to initiate the desorption of water and carbon dioxide from bed 12. Desorbed water and carbon dioxide are collected in water tank 23 and carbon dioxide tank 24, as described with reference to FIG. 2.

It will be understood that no external source of liquid water is required for the operation of the device of FIG. 4. Moreover, the device captures water from ambient air, and makes it available in a very pure form. Depending on demand, the device can be used as a source of carbon dioxide, with clean water as a byproduct; as a source of clean water with carbon dioxide as a byproduct; or as a source of both clean water and carbon dioxide.

The device of FIG. 3 was used in the following experiment. The adsorbent was active carbon impregnated with $K_2CO_3$.

Adsorption and desorption were carried out as described above. The desorption temperature was programmed as shown in FIG. 4 (dotted line; Setpoint T). The solid line shows the Liner Temperature, which closely followed the Setpoint Temperature. The Core Temperature initially lagged behind the former two temperatures, but eventually stabilized at 140° C.

It should be noted that the scale on the left hand side of the graph shows the temperature in ° C. and the $CO_2$ concentration of the desorbing gas in %. The dashed/dotted line shows the $CO_2$ concentration as a function of time. As can be seen, the desorbing gas is highly enriched in $CO_2$, around 60% at Core temperatures up to about 70° C. As the Core Temperature increased further the $CO_2$ concentration increased to reach about 100%.

Thus, the invention has been described by reference to certain embodiments discussed above. It will be recognized that these embodiments are susceptible to various modifications and alternative forms well known to those of skill in the art.

Many modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A device for conducting an adsorption/desorption temperature swing process having a desorption step conducted at least in part at a desorption temperature below 100° C., said device comprising (i) a reservoir containing water; (ii) a reactor containing an adsorbent; and (iii) a vacuum source; the reservoir, the reactor and the vacuum source being in fluid connection with each other during the desorption step, wherein the vacuum source is configured to cause water in the reservoir to evaporate, and water vapor to flow through the reactor for purging the adsorbent.

2. The device of claim 1 wherein the reservoir containing water is a reservoir containing liquid water.

3. The device of claim 1 wherein the reservoir containing water is an absorption column containing a water adsorbent material.

4. The device of any one of claims 1-3 further comprising a reservoir for collecting gas desorbed from the adsorbent during the desorption step.

5. The device of claim 1, further comprising one or more heat exchangers for recovering heat from gases leaving the reactor.

6. The device of claim 5 wherein heat recovered from gases leaving the reactor is transferred to water in the reservoir.

7. The device of claim 1, wherein the vacuum source is a vacuum pump.

8. The device of claim 7 wherein the vacuum pump is a self-drying vacuum pump.

9. The device of claim 1, wherein the vacuum source provides an operating pressure of 30 mbar or less.

10. The device of claim 1, further comprising a water source for replenishing water in the reservoir.

11. The device of claim 5, further comprising a reservoir for collecting demineralized water from the vacuum source and/or the one or more heat exchangers.

* * * * *